(12) United States Patent
Cheng et al.

(10) Patent No.: US 12,279,158 B2
(45) Date of Patent: Apr. 15, 2025

(54) WIRELESS COMMUNICATION NETWORK RESOURCE ALLOCATION METHOD WITH DYNAMIC ADJUSTMENT ON DEMAND

(71) Applicant: Xidian University, Xi'an (CN)

(72) Inventors: Nan Cheng, Xi'an (CN); Changle Li, Xi'an (CN); Longfei Ma, Xi'an (CN); Xiucheng Wang, Xi'an (CN); Ruijin Sun, Xi'an (CN)

(73) Assignee: Xidian University, Xi'an (CN)

( * ) Notice: Subject to any disclaimer, the term of this patent is extended or adjusted under 35 U.S.C. 154(b) by 542 days.

(21) Appl. No.: 17/857,114

(22) Filed: Jul. 4, 2022

(65) Prior Publication Data
US 2023/0189075 A1 Jun. 15, 2023

(30) Foreign Application Priority Data
Dec. 14, 2021 (CN) .......................... 202111530124.7

(51) Int. Cl.
| H04W 28/16 | (2009.01) |
| G06F 9/50 | (2006.01) |
| H04L 67/1008 | (2022.01) |

(52) U.S. Cl.
CPC .......... *H04W 28/16* (2013.01); *G06F 9/5044* (2013.01); *G06F 9/505* (2013.01); *H04L 67/1008* (2013.01)

(58) Field of Classification Search
None
See application file for complete search history.

(56) References Cited

U.S. PATENT DOCUMENTS

| 2020/0225996 A1* | 7/2020 | Sharma | ............... G06F 15/7889 |
| 2024/0007414 A1* | 1/2024 | Jain | ...................... G06F 9/5088 |

* cited by examiner

*Primary Examiner* — Adam Lee
(74) *Attorney, Agent, or Firm* — Hemisphere Law, PLLC; Zhigang Ma

(57) ABSTRACT

A wireless communication network resource allocation method implemented in a server in a wireless communication network, includes: obtaining task feature information of each user device and a CPU frequency of the server in each time slot; obtaining a task data volume average value; determining, based on a knowledge base including sample data groups and optimal resource allocation models, a target optimal resource allocation model matched with the task data volume average value and the CPU frequency of the server; obtaining, based on the task feature information of the user devices in the time slot and the target optimal resource allocation model, resource allocation results of the user devices, and transmitting task data to the user devices based on the results. A width of a dynamic neural network can be automatically adjusted according to task features and computational capacity, and on-demand adjustment of decision speed and resource optimality can be realized.

10 Claims, 4 Drawing Sheets

WIRELESS COMMUNICATION NETWORK RESOURCE ALLOCATION METHOD WITH DYNAMIC ADJUSTMENT ON DEMAND

TECHNICAL FIELD

The disclosure relates to a field of wireless communication, particular to a wireless communication network resource allocation method with dynamic adjustment on demand.

DESCRIPTION OF RELATED ART

In recent years, a fifth generation (5G) wireless communication network has been commercialized and deployed worldwide. Although the 5G network can greatly improve network performance and ensure service level performance, it still has some limitations. For example, the 5G network mainly relies on ground base stations that are intensively deployed in urban areas rather than in rural or remote areas, so it is difficult to provide efficient services in some remote and harsh areas.

With a flourishing development of emerging technologies such as air-space integrated networks, terahertz and intelligent reflective surfaces, as well as deep integration of artificial intelligence and communication technology, which provides a broad prospect for research on the sixth generation (6G) wireless communication network. In the 6G wireless communication network, user needs are more diverse, and the heterogeneity and dynamics of the network are further enhanced. Therefore, it is more challenging to allocate network resources reasonably to meet different user needs. On the one hand, due to the wide coverage, the application of software definition technology and artificial intelligence technology, there will be a large number of new services with different needs. These services and requirements should be handled and met efficiently and economically. On the other hand, the high degree of network dynamics, heterogeneity of network architecture and complexity of network resources will lead to unprecedented difficulties in network resource coordination. In order to solve these problems, 6G network will comprehensively develop new air interfaces and novel network architecture. The most important thing is to adopt advanced artificial intelligence technology to further improve network performance and provide on-demand services.

For a widely concerned resource allocation problem in wireless communication networks. Obviously, in order to obtain higher network performance, it is expected to obtain fast and optimal decisions. However, in most cases, speed (time required for the allocation decision process) and optimality (difference between a resulting allocation solution and an optimal solution) are compromise indicators. If the compromise indicators can be adjusted according to specific scenarios and service requirements, it is a reasonable solution. At present, a common method is to express the decision-making problem as an optimization problem, and then use the iteration-based method to solve it. However, using the iteration-based method may lead to greater computational complexity. Therefore, for a larger network size and higher network dynamics above 6G, this method may lead to too long convergence time of the algorithm, or even fail to solve the problem.

Compared with the traditional iteration-based algorithm, a neural network has less computation and decision-making time. Therefore, researchers expect to effectively solve the above network resource allocation problem by reasonably setting and training the neural network structure. However, in the 6G and future communication era, different scenarios may lead to different requirements for resource allocation decisions. For example, a base station serving autopilot will need to have a lower decision delay than a base station serving internet of things (IoT) monitoring. In addition, available computing resources on different base stations will be different, but most neural network models do not have the flexibility of decision-making speed and optimality on-demand adjustment. Therefore, how to propose a resource allocation method for the wireless communication network with dynamic adjustment on-demand based on the neural network is a hot issue worthy of study in this field.

SUMMARY OF THE DISCLOSURE

Embodiments of the disclosure aim to provide a wireless communication network resource allocation method that can be dynamically adjusted on demand, so as to achieve a purpose of dynamically adjusting the wireless communication network resources on demand. The specific technical solutions are as follows.

A wireless communication network resource allocation method with dynamic adjustment on-demand is implemented in a server in a wireless communication network, the wireless communication network further includes: user devices, and the method includes:

for each of time slots, obtaining, in the time slot, task feature information of each of the user devices and a central processing unit (CPU) frequency of the server; the task feature information of each of the user devices includes: a task data volume, a task transmission distance, and a task importance weight;

obtaining a task data volume average value based on the task data volumes of the user devices;

determining, based on a knowledge base, a target optimal resource allocation model matched with the task data volume average value and the CPU frequency of the server;

the knowledge base including: a plurality of sample data groups composed of different task data volume average values and CPU frequencies of the server, and optimal resource allocation models corresponding to the plurality of sample data groups respectively; the optimal resource allocation model corresponding to each of the plurality of sample data groups is obtained by taking a minimum of total delays in resource allocation as an optimization objective and optimizing widths of dynamic neural networks in trained resource allocation models based on the task feature information of the user devices of the sample data group and the CPU frequency of the server of the sample data group; and a resource to be allocated in the same time slot is one of a bandwidth and a power; and obtaining, based on the task feature information of the user devices in the time slot, resource allocation results of the user devices by using the target optimal resource allocation model, and transmitting task data to the user devices based on the resource allocation results.

In an embodiment, the obtaining, based on the task feature information of the user devices in the time slot, resource allocation results of the user devices by using the target optimal resource allocation model, includes:

quantizing the task feature information of each of the user devices in the time slot into an input vector; and inputting the input vectors of the user devices to the target optimal resource allocation model to obtain resource allocation values of the user devices in the time slot as the resource allocation results.

In an embodiment, the optimal resource allocation model corresponding to each of the plurality of sample data groups in the knowledge base is obtained by:

determining the plurality of sample data groups composed of the different task data volume average values and the CUP frequencies of the server; each of the plurality of sample data groups including: one of the different task data volume average values and one of the CUP frequencies of the server;

for each of the plurality of sample data groups, obtaining the task feature information of the user devices based on the task data volume average value of the sample data group, and obtaining allocated resource data of each of the user devices; the allocated resource data being the other one of the bandwidth and the power;

obtaining the trained resource allocation models with fixed widths corresponding to the dynamic neural networks with different widths;

determining the total delay of each of the resource allocation models with the fixed widths in the resource allocation based on the task feature information of the user devices of the sample data group, the CPU frequency of the server of the sample data group and the allocated resource data of the user devices of the sample data group; and determining one of the resource allocation models with the fixed widths corresponding to the minimum of the total delays of the sample data group as the optimal resource allocation model corresponding to the sample data group.

In an embodiment, the obtaining the trained resource allocation models with fixed widths corresponding to the dynamic neural networks with different widths, comprises:

constructing initial resource allocation models based on a dynamic neural networks with an adjustable width; and for each of the initial resource allocation models with widths, training the initial resource allocation model with the width through back propagation based on the task feature information of the user devices and a preset loss function, and obtaining the trained resource allocation model with the fixed width.

In an embodiment, a structure of each of the initial resource allocation models includes: an input network, a plurality of expert layers, and an output network connected in sequential order;

each of the plurality of expert layers includes: an input sublayer, a gating function layer connected to an output end of the input sublayer, a softmax layer connected to an output end of the gating function layer, M number of expert sublayers in parallel with each other connected to another output end of the input sublayer and an output end of the softmax layer, and an output sublayer connected to output ends of the M number of expert sublayers; the width of the dynamic neural network in the initial resource allocation model is determined by a number of used expert sublayers of the M number of expert sublayers, and whether one of the M number of expert sublayers is used is controlled by a gating value.

In an embodiment, an input-output mapping function of the gating function network is that: $G(X)=\text{RemainK}(H(X), K)$;

where $H(X)=X \cdot W_g + \text{Normal} \cdot \text{Softplus}(X \cdot W_{noise})$, RemainK( ) represents a sparce function, K represents the width of the dynamic neural network, X represents an input matrix, Wg represents a weight coefficient matrix of the gating function network, Normal represents a standard normal white noise, Softplus( ) presents an activation function, and $W_{noise}$ represents a noise matrix.

In an embodiment, the preset loss function is that:

$$\text{Loss}=\Sigma_{i=1}^{N} w_i T_{tra,i} + L_{balance}, \quad L_{balance}=w_{balance} \cdot CV (\Sigma_{j=1}^{M} g_j)^2;$$

where Loss represents the preset loss function, N represents a total number of the user devices in a training sample, $w_i$ represents the task importance weight in the task feature information of the ith user device in the training sample, $T_{tra,i}$ represents a transmission delay corresponding to the ith user device in the training sample, $L_{balance}$ represents an additional loss item, $w_{balance}$ represents a preset loss coefficient, CV( ) represents a variation coefficient function, M represents a total number of the expert sublayers, and $g_j$ represents the gating value of the jth expert sublayer.

In an embodiment, the determining the total delay of each of the resource allocation models with the fixed widths in the resource allocation based on the task feature information of the user devices of the sample data group, the CPU frequency of the server of the sample data group and the allocated resource data of the user devices of the sample data group, includes for each of the resource allocation models with the fixed widths, obtaining resource allocation results of the user devices of the sample data group through the resource allocation model with the fixed width based on the task feature information of the user devices of the sample data group;

calculating the transmission delays generated by the server transmits task data to the user devices respectively based on the resource allocation results of the user devices of the sample data group and the allocated resource data of the user devices of the sample data group;

calculating an operation delay generated by the server uses the resource allocation model with the fixed width to perform the resource allocation based on the CPU frequency of the server of the sample data group;

summing the operation delay and the transmission delay of each of the user devices to obtain a sum delay of each of the user devices, and calculating a product of the sum delay of each of the user devices and the task importance weight of the task feature information of each of the user devices to obtain a weighted sum delay of each of the user devices; and calculating a sum of the weighted sum delays of the user devices of the sample data group, and obtaining the total delay of the resource allocation model with the fixed width in the resource allocation for the sample data group.

In an embodiment, a calculation formula of the transmission delay is that:

$$T_{tra,i} = \frac{s_i}{b_i \log_2\left(1 + \frac{P_i\left(\frac{d_0}{d_i}\right)^2 g_0}{\sigma^2}\right)};$$

where $s_i$ represents the task data volume of the task feature information of the ith user device, $d_i$ represents the task transmission distance of the task feature information of the ith user device, $d_0$ represents an unit distance, $g_0$ represents a channel gain, $\sigma^2$ represents a noise power, $P_i$ represents a power allocated to the ith user device, $b_i$ represents a bandwidth allocated to the ith user device, one of $P_i$ and $b_i$ is obtained from the resource allocation model with the fixed width, and the other one of $P_i$ and $b_i$ represents the allocated resource data.

In an embodiment, a calculation formula of the operation delay is that:

$$T_{com} = \frac{K\alpha\phi}{f};$$

where K represents the width of the dynamic neural network, α represents a CPU calculation efficiency factor, ϕ represents a computational complexity of the expert sublayer, and f represents the CPU frequency of the server.

In the solutions provided by the embodiments of the disclosure, aiming at the allocation of the bandwidth resource or the power resource of users, the wireless communication network resource allocation method with dynamic adjustment on demand implemented in the server is proposed. In each time slot, the task feature information of each user device and the CPU frequency of the server are obtained, and the target optimal resource allocation model is determined in the predetermined knowledge base by using the task data volume average value calculated by the task data volumes of the user devices and the CPU frequency of the server; the task feature information of the user devices in the time slot are input into the target optimal resource allocation model, the resource allocation result of each user device in the time slot is obtained, and the task data is transmitted to the user devices by using the resource allocation results.

The embodiments of the disclosure determine in advance the different task data volume average values and the CPU frequencies of the server to form the sample data groups. For each of the sample data groups, the optimal resource allocation model corresponding to the sample data group is obtained by taking the minimum of the total delays of the trained resource allocation models constructed by the dynamic neural networks with the different widths in the resource allocation as the optimization goal and optimizing the widths of the dynamic neural networks based on the task feature information of the user devices and the CPU frequency of the server. Therefore, compared with a static neural network used in the related art, the embodiments of the disclosure can automatically adjust the width of the dynamic neural network according to the task feature information characterizing the task features and the CPU frequency of the server characterizing the computing power, thereby the optimal resource allocation model with the optimal width of the dynamic neural network can be obtained, the optimal resource allocation effect matching the actual demand can be realized, and the speed of decision-making and the optimality of resource allocation can be adjusted on demand according to the service requirements and available computing resources, which has obvious flexibility.

DETAILED DESCRIPTION OF EMBODIMENTS

The technical solutions in the embodiments of the disclosure will be clearly and completely described below in combination with the drawings in the embodiments of the disclosure. Obviously, the described embodiments are only part of the embodiments of the disclosure, not all of them. Based on the embodiments of the disclosure, all other embodiments obtained by those skilled in the art without making creative work belong to the protection scope of the disclosure.

In order to realize the purpose of dynamically adjusting wireless communication network resources on demand, an embodiment of the disclosure provides a wireless communication network resource allocation method with dynamic adjustment on demand.

First, the wireless communication network resource allocation method with dynamic adjustment on demand provided by the embodiment of the disclosure is introduced.

The wireless communication network resource allocation method with dynamic adjustment on demand is implemented in a server in a wireless communication network, and the wireless communication network includes user devices. For example, the server can be a base station server, and the user device can be one of a user's mobile phone, a computer, and other devices.

Figure 1:
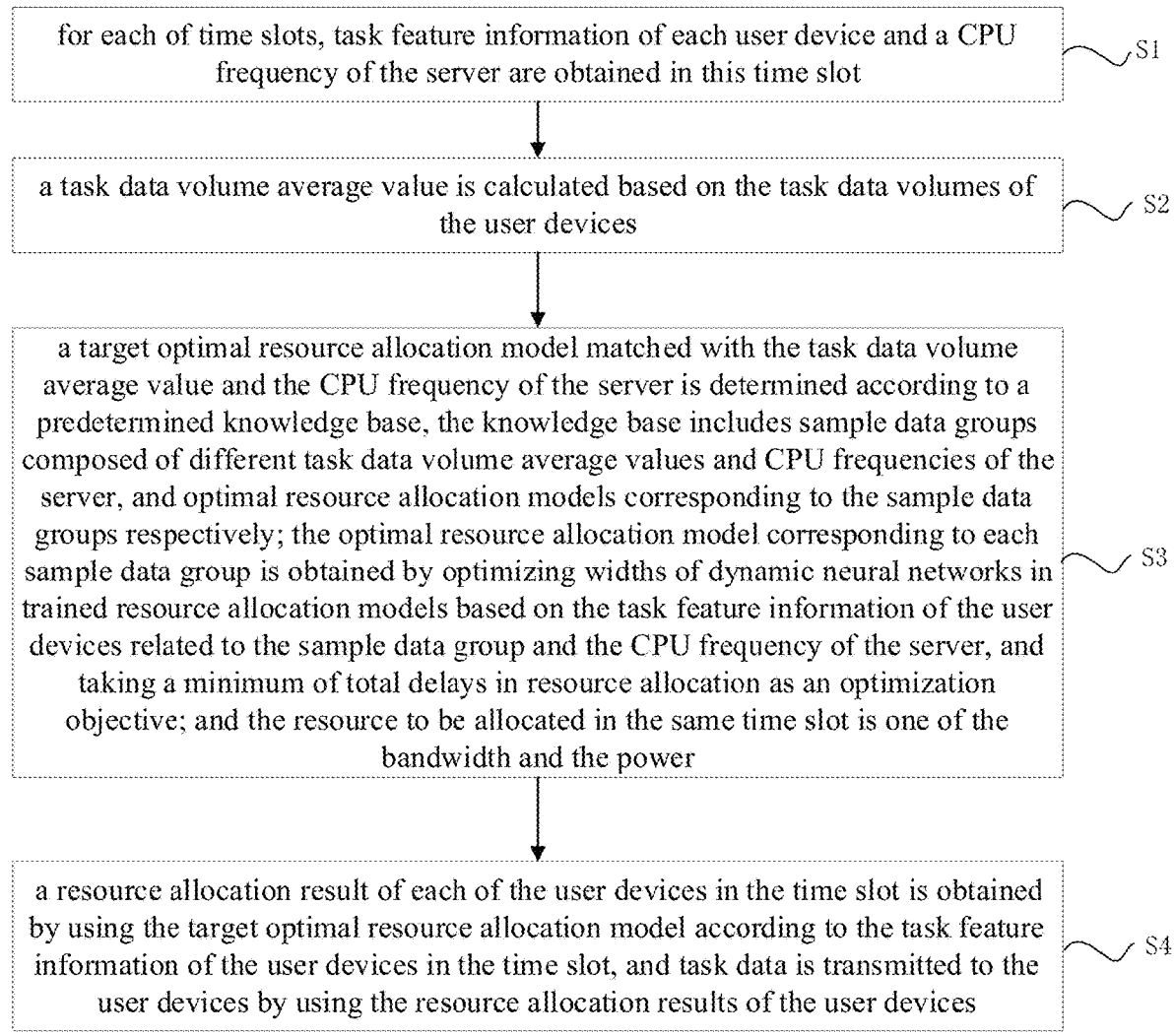
FIG. 1 illustrates a schematic flowchart of a wireless communication network resource allocation method with dynamic adjustment on demand according to an embodiment of the disclosure.

As illustrated in FIG. 1, the wireless communication network resource allocation method with dynamic adjustment on demand of the embodiment of the disclosure may include the steps S1 to S4.

At the step S1, for each of time slots, task feature information of each user device and a CPU frequency of the server are obtained in this time slot.

The embodiment of the disclosure mainly considers a situation of multi-user single server in the wireless communication network. In each time slot, each user device generates a task locally and transmits it to the server for processing. The server needs to allocate bandwidth or power resources for each user device in each time slot. In each time slot, the total bandwidth and total power occupied by all the user devices are certain, but the specific task conditions are different. Therefore, the task is described in detail with the task feature information. The user device determines the task feature information and sends it to the server, the server uses the selected resource allocation model to allocate the resources in the time slot according to the task feature information of the different user devices in the current time slot to better match the actual task requirement of each user device, and improve resource utilization. Specifically, the resource allocated by the server to each user device can be one of the bandwidth and the power, but the resource to be allocated to the user devices in the same time slot are of the same type. That is, the resource allocation model used by the embodiment of the disclosure to allocate the resource in the same time slot is a bandwidth allocation model or a power allocation model.

The task feature information of each user device includes a task data volume, a task transmission distance, and a task importance weight.

The task data volume represents a data size of the task, and its unit can be kilobyte (KB). The task transmission distance indicates a distance from the user device to the server, its unit can be meter. The task importance weight indicates an importance of the task. In the embodiment of the disclosure, different level values of the task importance weight can be preset to realize the quantitative description of the task importance. Among the several different level values, the larger value represents the higher importance, the smaller value represents the lower importance, and so on. For example, four levels can be set for the task importance weight. The corresponding values can include 0.8, 0.4, 0.2 and 0.1. The larger the value, the higher the importance. Of course, the number of the level values and specific values can be reasonably set according to needs. No specific restrictions are made here.

At the same time, due to the diversity of the server and deployment environments, the computing power of the server will be different in different situations. Therefore, when allocating the resource, it is necessary to consider the computing power of the server at the same time, so as to improve resource utilization and processing efficiency. In the embodiment of the disclosure, the computing power of the server is measured by the CPU frequency of the server in the current time slot. The CPU frequency can also be called the CPU clock frequency, that is, the working frequency during CPU computing, which is used to represent the CPU computing speed. The server can obtain the specific value of its CPU frequency by itself.

In order to facilitate the following understanding, it is assumed that the wireless communication network includes N number of the user devices $u_1, u_2, \ldots, u_N$, and N is a natural number greater than 0. In the current time slot, in the task feature information of the user device $u_i (i \in [1, N])$, the task data volume, the task transmission distance and the task importance weight are expressed in $s_i$, $d_i$ and $w_i$ respectively, and the CPU frequency of the server is expressed in f.

At the step S2, a task data volume average value is calculated based on the task data volumes of the user devices.

Specifically, after obtaining the task data volumes of the user devices, the server can calculate the average value of these task data volumes to obtain the task data volume average value. For the convenience of later description, the task data volume average value can be expressed as $\bar{s}$. The task data volume average value $\bar{s}$ in this step and the CPU frequency f of the server obtained in the step S1 can form a test data group $(\bar{s}, f)$.

It should be noted that since the calculation amount of the task data volume average value calculated in this step is small, the operation delay can be ignored.

At the step S3, a target optimal resource allocation model matched with the task data volume average value and the CPU frequency of the server is determined according to a predetermined knowledge base.

Specifically, the knowledge base includes sample data groups composed of different task data volume average values and CPU frequencies of the server, and optimal resource allocation models corresponding to the sample data groups respectively. The optimal resource allocation model corresponding to each sample data group is obtained by optimizing widths of dynamic neural networks in trained resource allocation models based on the task feature information of the user devices related to the sample data group and the CPU frequency of the server, and taking a minimum of total delays in resource allocation as an optimization objective. The resource to be allocated in the same time slot is one of the bandwidth and the power.

In the embodiment of the disclosure, under the same deployment environment as the actual use scenario, the sample data groups are built in the knowledge base in advance. Each of the sample data groups includes the task data volume average value and the CPU frequency of a server. Each of the sample data groups corresponds to an optimal resource allocation model. For the test data group determined by the step S2 in the embodiment of the disclosure, one of the sample data groups with the same $\bar{s}$ and f values can be found in the knowledge base, so the optimal resource allocation model corresponding to the found sample data group can be determined as the target optimal resource allocation model matched with the test data group.

The optimal resource allocation model corresponding to each sample data group is obtained by traversing the widths of different dynamic neural networks in the trained resource allocation models and seeking an optimal width with the minimum total delay in resource allocation as the optimization goal based on the task feature information of the user device and the CPU frequency of the server in the sample data group. Therefore, the optimal resource allocation model corresponding to each sample data group actually represents the optimal resource allocation model with the optimal width of the dynamic neural network determined according to the actual situation of the sample data group.

It can be understood by those skilled in the art that depth and width are the two basic dimensions of the depth neural network. Sufficient width can ensure that each layer of the deep neural network can learn rich features, such as texture features of different directions and frequencies. If the width is too narrow, feature extraction will not be sufficient, and enough information will not be learned, which will limit the performance of the model. However, the width contributes a lot of computation of the network, and too wide network will extract too many repeated features, which will increase the computational burden of the model. Therefore, it is necessary to consider the model performance and computation and select the appropriate width.

In order to make the layout clear, a construction process of the knowledge base will be described later.

At the step S4, a resource allocation result of each of the user devices in the time slot is obtained by using the target optimal resource allocation model according to the task feature information of the user devices in the time slot, and task data is transmitted to the user devices based on the resource allocation results of the user devices.

In an illustrated embodiment, the resource allocation result of each of the user device in the time slot is obtained by using the target optimal resource allocation model based on the task feature information of the user devices in the time slot, includes steps (1) and (2).

At the step (1), the task feature information of each user device in the time slot is quantized into an input vector.

At the step (2), the obtained input vectors of the user devices are inputted into the target optimal resource allocation model, and a resource allocation value of each user device in the time slot is obtained as the corresponding resource allocation result.

Specifically, the step (1) quantifies the task feature information of the user devices obtained in the step S1 and represent them as the input vectors with unified dimension. Specifically, the task data volume s, the task transmission distance and the task importance weight $w_i$ in the task feature information of each user device are integrated into the input vector $\vec{a}_i=[s_i, d_i, w_i]$. The step (2) is to input the input vectors of the user devices into the target optimal resource allocation model according to the user order. If the target optimal resource allocation model corresponds to the bandwidth allocation model, a bandwidth allocation vector $\vec{b}$ in the time slot for the user devices can be obtained, in which the bandwidth allocation vector $\vec{b}$ includes the bandwidth value allocated for each user device. If the target optimal resource allocation model corresponds to the power allocation model, a power allocation vector $\vec{P}$ of the time slot for the user devices can be obtained, in which the power allocation vector $\vec{P}$ includes the power value allocated for each user device.

The purpose of the resource allocation is that the server uses the allocated resource to transmit the task data required by each user device to each user device. The task data is the data of a task referred to by the task feature information of the user device in the step S1. Therefore, after determining the resource allocation solution, that is, after obtaining the resource allocation results of the user devices, the server can use the determined resource allocation results of the user devices to transmit the required task data to the user devices for each user device.

It is worth mentioning that the step of determining the input vector $\vec{a}_i$ can be completed in the step S1 or before the step S4, which is reasonable.

In the solutions provided by the embodiments of the disclosure, aiming at the allocation of the bandwidth resource or the power resource of users, the wireless communication network resource allocation method with dynamic adjustment on demand implemented in the server is proposed. In each time slot, the task feature information of each user device and the CPU frequency of the server are obtained, and the target optimal resource allocation model is determined in the predetermined knowledge base by using the task data volume average value calculated by the task data volumes of the user devices and the CPU frequency of the server; the task feature information of the user devices in the time slot are input into the target optimal resource allocation model, the resource allocation result of each user device in the time slot is obtained, and the task data is transmitted to the user devices by using the resource allocation results.

The embodiments of the disclosure determine in advance the different task data volume average values and the CPU frequencies of the server to form the sample data groups. For each of the sample data groups, the optimal resource allocation model corresponding to the sample data group is obtained by taking the minimum of the total delays of the trained resource allocation models constructed by the dynamic neural networks with the different widths in the resource allocation as the optimization goal and optimizing the widths of the dynamic neural networks based on the task feature information of the user devices and the CPU frequency of the server. Therefore, compared with a static neural network used in the related art, the embodiments of the disclosure can automatically adjust the width of the dynamic neural network according to the task feature information characterizing the task features and the CPU frequency of the server characterizing the computing power, thereby the optimal resource allocation model with the optimal width of the dynamic neural network can be obtained, the optimal resource allocation effect matching the actual demand can be realized, and the speed of decision-making and the optimality of resource allocation can be adjusted on demand according to the service requirements and available computing resources, which has obvious flexibility.

The following describes in detail the relevant process of building the knowledge base according to the embodiments of the disclosure. In the embodiments of the disclosure, resource allocation models with fixed widths corresponding to dynamic neural networks with different widths can be constructed and trained first; then, the resource allocation models with the fixed widths are used to determine the optimal resource allocation model corresponding to each sample data group in the knowledge base. In order to understand the above process, first, the process of obtaining the resource allocation model with the fixed width is explained.

In an illustrated embodiment, the resource allocation models with the fixed widths are obtained by the steps a1 to a2.

At the step a1, building resource allocation models based on a dynamic neural network with an adjustable width.

The embodiment of the disclosure uses the dynamic neural network with the adjustable width to build the resource allocation models. Please refer to FIG. 2, which illustrates a schematic structural diagram of the resource allocation model based on the dynamic neural network with the adjustable width in the embodiment of the disclosure. A structure of the resource allocation model includes:

an input network, a plurality of expert layers and an output network, which are connected in sequential order.

Figure 2:
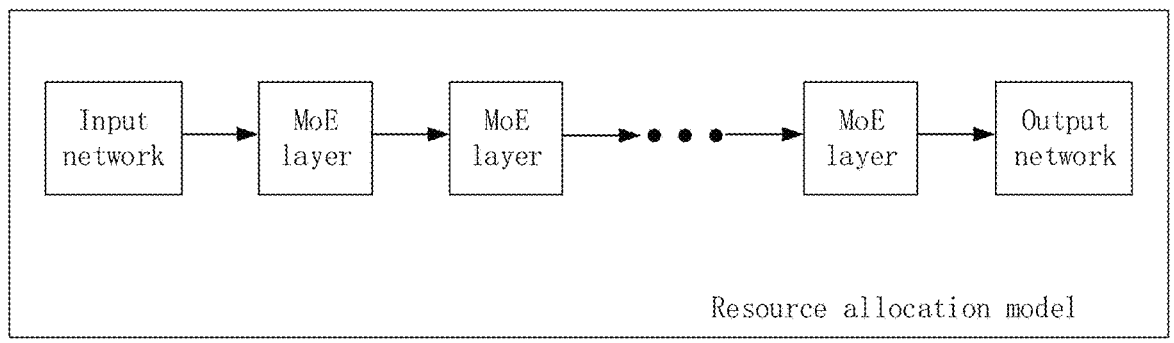
FIG. 2 illustrates a schematic structural diagram of a resource allocation model based on a dynamic neural network with an adjustable width according to an embodiment of the disclosure.

In the FIG. 2, Resource allocation model represents the resource allocation model, Input network represents the input network, MoE layer represents the expert layer, and Output network represents the output network.

Specifically, the input network can be understood as a function, which is used to splice the input vectors of the user devices to obtain an input matrix $$\begin{bmatrix} s_1, d_1, w_1 \\ s_2, d_2, w_2 \\ \cdots \\ s_N, d_N, w_N \end{bmatrix}.$$

The expert layer, also known as a sparsely-gated mixture-of-experts layer (MoE), is the neural network. A structure of each expert layer is illustrated in FIG. 3, FIG. 3 illustrates a schematic structural diagram of the expert layer in the resource allocation model of the embodiment of the disclosure.

The expert layer includes an input sublayer, a gating function network connected to an output end of the input sublayer, a softmax layer connected to an output end of the gating function network, parallel M number of expert sublayers connected to another output end of the input sublayer and the output end of the softmax layer, and an output sublayer connected to the output ends of the M number of expert sublayers. The width of the dynamic neural network in the resource allocation model is determined by the number of the used expert sublayers, and whether one expert sublayer is used is controlled by its gating value.

Figure 3:
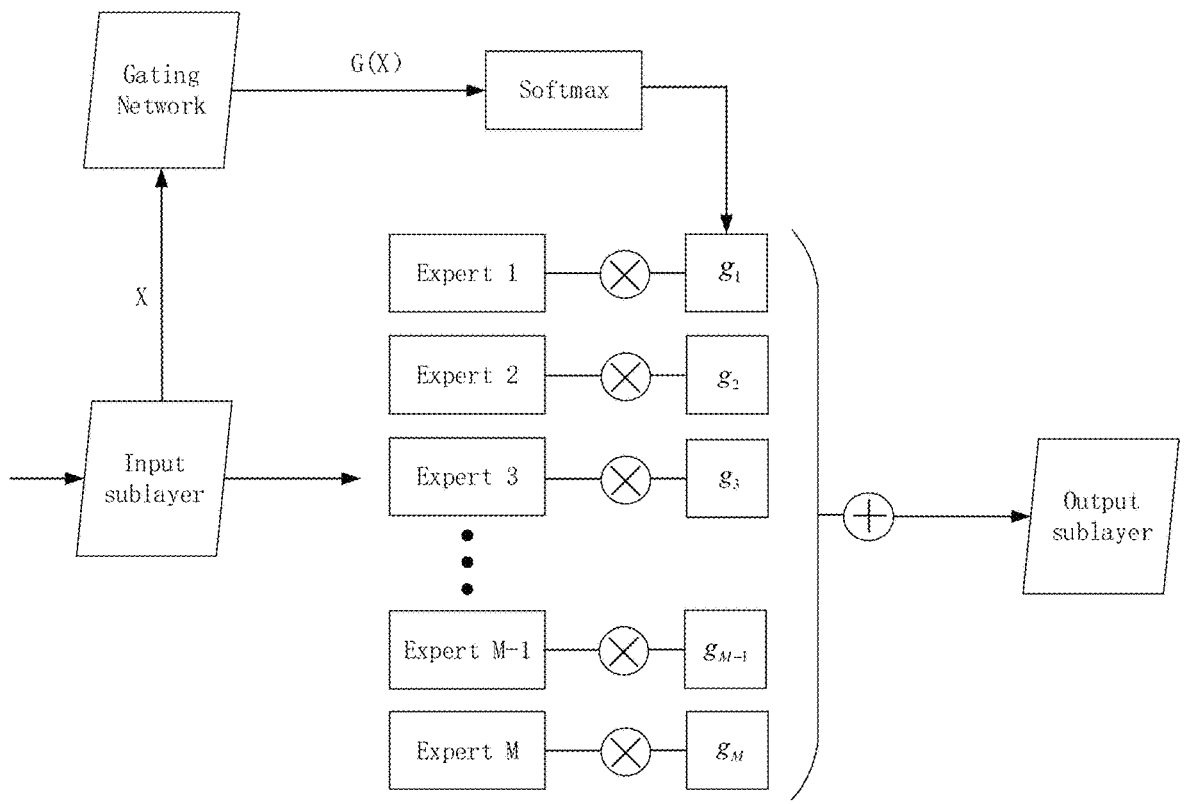
FIG. 3 illustrates a schematic structural diagram of an expert layer in the resource allocation model according to an embodiment of the disclosure.

In the FIG. 3, Input sublayer represents the input sublayer, Gating Network represents the gating function network, softmax represent the softmax layer, Expert 1, Expert 2, Expert 3 . . . Expert M-1 and Expert M represent the M number of the expert sublayers respectively, M is a natural number greater than 0; $g_1, g_2, g_3, \ldots g_{M-1}$ and $g_M$ represent the gating values of the expert sublayers, that is, the weighted values output by the gating function network to each expert sublayer, and Output sublayer represents the output sublayer.

For each expert layer, the gating function network is configured to output the gating values of the M number of the expert sublayers according to different variables X and pre-determined super parameters K ($K \in [1, M]$) transferred from the input sublayer. When the gating value of one expert sublayer is 0, the one expert sublayer does not participate in the operation. The width of the expert layer is controlled by controlling the number of the expert sublayers participating in the operation, so as to dynamically adjust the width of the dynamic neural network, which realizes the width adjustment of the resource allocation model.

In order to make full use of each load sublayer, that is, the expert sublayer, and save computing resources, an input-output mapping function of the gating function network is set as follows: $G(X) = \text{RemainK}(H(X), K)$.

Where $H(X) = X \cdot W_g + \text{Normal} \cdot \text{Softplus}(X \cdot W_{noise})$, RemainK( ) represents a sparce function; K represents the super parameter described above, which represents the width of the used dynamic neural network, that is, the width of the dynamic neural network in the resource allocation model actually used; X represents the input matrix, which is obtained by splicing the input vectors of the user devices; Wg represents the weight coefficient matrix of the gating function network; Normal represents standard positive white noise; Softplus( ) presents activation function; and $W_{noise}$ represents the noise matrix.

$X \cdot W_g$ represents the specificity of different inputs X to the selection of expert sublayers; $\text{Normal} \cdot \text{Softplus}(X \cdot W_{noise})$ represents the noise term, which is used to balance the weights $[g_1, g_2, \ldots, g_M]$ of the expert sublayers. RemainK( ) reserves the K number of maximum values in the independent variables according to the given super parameters K, and sets the remaining values as $-\infty$. Since the output of the gating function network is connected to the softmax layer, only the selected K number of valid values are reserved after passing through the softmax layer, and the remaining values $-\infty$ become 0. Therefore, under different inputs X and super parameters K, some of the gating values $[g_1, g_2, \ldots, g_M]$ of the M number of the expert sublayers will be set to 0, while the gating values that are not 0 correspond to the expert sublayers involved in the operation.

Figure 4:
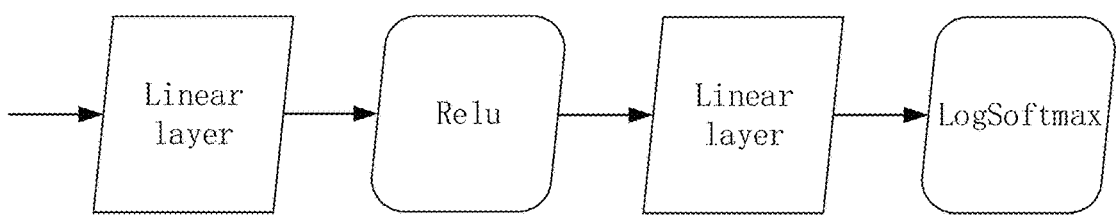
FIG. 4 illustrates a schematic structural diagram of an expert sublayer according to an embodiment of the disclosure.

In order to enhance the learning ability of the resource allocation model and obtain better allocation performance, the structure of each expert sublayer is set, as illustrated in FIG. 4, FIG. 4 illustrates a schematic structural diagram of the expert sublayer of the embodiment of the disclosure. The expert sublayer is composed of two linear layers with activation functions. The first linear layer uses the rectified linear unit (ReLU) function as the activation function, and the second linear layer uses the LogSoftmax function as the activation function, so as to reduce the difficulty of network training and improve the convergence speed. In the FIG. 4, Linear layer represents the linear layer, Relu represents the ReLU activation function, and LogSoftmax represents the LogSoftmax activation function.

The output network of the resource allocation model can be understood as a function to calculate the resource allocation value of each user device according to the final outputs of the expert layers. The final output of the expert layers are a vector, and each value in the vector is the resource proportion occupied by each user device. Since the total bandwidth and total power occupied by the user devices are certain, the output network can determine the resource allocation value of each user device according to the resource proportions in the vector.

Through the step a1, the resource allocation models with different widths K can be obtained.

At the step a2, for the resource allocation model of the width, the resource allocation model of the width is trained by using the task feature information of the user devices and the preset loss function through back propagation, and the trained resource allocation model with the fixed width under this width is obtained.

For different resource allocation models with given widths, the initial loss function for training can be set as: $\text{Loss}_0 = \sum_{i=1}^{N} w_i T_{tra,i}$.

Where N represents the total number of the user devices in the training sample; $w_i$ represents the task importance weight in the task feature information of the ith user device in the training sample; $T_{tra,i}$ represents the transmission delay corresponding to the ith user device in the training sample. For ease of understanding, the calculation method of $T_{tra,i}$ will be introduced later.

In order to make full use of each expert sublayer and avoid the situation that only a few expert sublayers have large weights, while the weight of most of the remaining expert sublayers is low or 0, the embodiment of the disclosure constructs an additional loss item as follows: $L_{balance} = w_{balance} \cdot CV(\sum_{j=1}^{M} g_j)^2$.

Where $L_{balance}$ represents the additional loss item; $w_{balance}$ represents the preset loss coefficient; CV( ) represents the variation coefficient function, which represents the degree of dispersion of weight values of different expert sublayers; M represents the total number of the expert sublayers; $g_j$ represents the gating value of the jth expert sublayer.

The embodiment of the disclosure uses the additional loss term to correct the initial loss function, and the preset loss function is as follows:

$\text{Loss} = \sum_{i=1}^{N} w_i T_{tra,i} + L_{balance}$

Where Loss represents the preset loss function, for the meanings of other parameters, please refer to the relevant explanations above.

The training process for resource allocation models with different widths can include the following steps ① to ④.

At the step ①, in the same deployment environment as the actual use scenario, the task feature information of the user devices and the CPU frequency of the server are obtained as the training sample.

At the step ②, determining the resource allocation model corresponding to any unused value in $K \in [1, M]$.

The value of K can be randomly selected in each time in [1,M], but the values of K are not repeated every time.

At the step ③, inputting the task feature information of the user devices in the training sample into the current resource allocation model, and using the preset loss function and back-propagation algorithm to iteratively train the parameters to be optimized in the current resource allocation model until the numerical variation of the loss function is less than the preset value, indicating that the training for the current resource allocation model is completed, and the resource allocation model with the fixed width for the current training is obtained.

The back-propagation algorithm is called BP algorithm for short. For the training process of the resource allocation model by using the back propagation algorithm, please refer to the relevant technical understanding, which will not be described in detail here.

The preset value can be set as required, such as 0.01.

At the step ④, returning to execute the step ② until the values in [1,M] are traversed, and the resource allocation model with the fixed width corresponding to each K is obtained.

The following describes the determination process of the optimal resource allocation model corresponding to each sample data group. In an illustrated embodiment, the determination process of the optimal resource allocation model corresponding to each sample data group in the knowledge base includes the steps b1 to b5.

At the step b1, determining the sample data groups composed of the different task data volume average values and the CPU frequencies of the server.

Specifically, each sample data group includes one of the task data volume average values and one of the CPU frequencies of the server.

Specifically, the step b1 may include the following steps b11 to b13.

At the step b11, determining numerical ranges corresponding to the task data volume average value and the CPU frequency of the server respectively.

The embodiment of the disclosure can determine the numerical range corresponding to the task data volume average value and the numerical range corresponding to the CPU frequency of the server through a large number of sample data, so that these two ranges can cover the deployment environment of all actual use scenarios, that is, in actual use, the CPU frequency of the server determined in the step S1 will not exceed the numerical range corresponding to the CPU frequency of the server, and the task data volume average value calculated by the step S2 will not exceed the value range corresponding to the task data volume average value.

Specifically, the numerical range corresponding to the task data volume average value can be expressed as $[s_{lower}, s_{upper}]$, where $s_{lower}$ and $s_{upper}$ respectively represent a lower limit and an upper limit of the numerical range corresponding to the task data volume average value. The numerical range corresponding to the CPU frequency of the server can be expressed as $[f_{lower}, f_{upper}]$, $f_{lower}$ and $f_{upper}$ respectively represent a lower limit and an upper limit of the numerical range corresponding to the CPU frequency of the server.

At the step b12, discrete values are respectively taken within the numerical range corresponding to the task data volume average value and the numerical range corresponding to the CPU frequency of the server.

Specifically, by discretizing values at equal intervals in $[s_{lower}, s_{upper}]$ and $[f_{lower}, f_{upper}]$, the task data volume average value and the CPU frequency of the server can be obtained.

At the step b13, the task data volume average values obtained after discretization is combined with the CPU frequencies of the server to obtain the sample data groups.

It is understandable that, according to probability, the task data volume average values obtained after discretization can be combined with the CPU frequencies of the server to obtain the sample data groups.

At the step b2, for each sample data group, obtaining the task feature information of the user devices and the allocated resource data of each user device according to the task data volume average value in the sample data group.

Specifically, one sample data group is taken as an example to explain. For this sample data group [s̄, f], the task feature information of the user devices is randomly generated, and the allocated resource data of each user device is obtained.

The allocated resource data is the data corresponding to another resource other than the resource to be allocated in the bandwidth and the power.

That is, if the resource to be allocated is the bandwidth, the allocated resource data is the power data; or if the resource to be allocated is the power, the allocated resource data is the bandwidth data. The allocated resource data of each user device can be obtained through actual measurement or set by empirical value.

At the step b3, obtaining the resource allocation models with the fixed widths corresponding to the dynamic neural networks with different widths.

Please refer to the previous description for the obtaining process of the resource allocation model with the fixed width. This step can directly obtain the resource allocation models with different fixed width that have been trained.

At the step b4, determining the total delay of each resource allocation model with the fixed width in the resource allocation for the sample data group by using the task feature information of the user devices of the sample data group, the CPU frequency of the server and the allocated resource data of each user device.

This step is to use the task feature information of the user devices of the sample data group to obtain the resource allocation result by using each resource allocation model with the fixed width, and then using the resource allocation results and the CPU frequency of the server of the sample data group to calculate the total delay of the corresponding resource allocation model with fixed width in the resource allocation.

In an illustrated embodiment, the step b4 can include the steps b41 to b45.

At the step b41, for each resource allocation model with the fixed width, the resource allocation results of the user devices in the sample data group are obtained from the resource allocation model with the fixed widths based on the task feature information of the user devices in the sample data group.

For ease of understanding, the following is an example of the resource to be allocated in the resource allocation model as the bandwidth. It can be understood that when the resource to be allocated in the resource allocation model is the power, the processing process is similar.

Specifically, the task feature information of each user devices in the sample data group is quantized into an input vector, and the obtained input vectors of the user devices are input into each of the resource allocation models with the fixed widths corresponding to K=1, 2, . . . , M respectively, then each resource allocation model with the fixed width can obtain the bandwidth allocation result of each user device, that is, a bandwidth allocation vector $\vec{b}_K$ can be obtained.

The ith value $b_{Ki}$ in $\vec{b}_K$ represents the bandwidth value allocated by the resource allocation model corresponding to the width K for the ith user device of the sample data group.

At the step b42, using the resource allocation results and the allocated resource data of the user devices, the transmission delay generated by the server transmits task data to each user device is calculated.

For the ith user device of the sample data group, the generated task can be expressed as $O_i$, the total delay for completing the task transmission, includes the operation time (hereinafter referred to as the operation delay) for bandwidth allocation by the server and the time (hereinafter referred to as the transmission delay) spent in the transmission process.

In the embodiment of the disclosure, a calculation formula of the transmission delay is as follows:

$$T_{tra,i} = \frac{s_i}{b_i \log_2\left(1 + \frac{P_i\left(\frac{d_0}{d_i}\right)^2 g_0}{\sigma^2}\right)}.$$

Where $s_i$ represents the task data volume of the task feature information of the ith user device, $d_i$ represents the task transmission distance of the task feature information of the ith user device, $d_0$ represents the unit distance, $g_0$ represents channel gain; $\sigma^2$ represents noise power, $P_i$ represents the power allocated to the ith user device; $b_i$ represents the bandwidth allocated to the ith user device, one of $P_i$ and $b_i$ is obtained from the fixed width resource allocation model, and the other one of $P_i$ and $b_i$ represents the allocated resource data.

As illustrated by the above example, $s_i$ and $d_i$ in the step b42 respectively represent the task data volume and the task transmission distance in the task feature information of the ith user device of the sample data group, $b_i$ represents the bandwidth allocated to the ith user device of the sample data group, which is obtained in the step b41, $P_i$ represent the power allocated to the ith user device of the sample data group, which is the allocated resource data, $d_0$, $g_0$ and $\sigma^2$ are known data.

Then, using the above formula of $T_{tra,i}$, each user device of the sample data group can get one $T_{tra,i}$ for the width K.

At the step b43, the CPU frequency of the server of the sample data group is used to calculate the operation delay generated by the server uses the resource allocation model with the fixed width to calculate the resource allocation.

For the same width K, when the CPU frequency of the server is determined, the operation delay corresponding to each user device of the sample data group is the same.

Specifically, a calculation formula of the operation delay is as follows:

$$T_{com} = \frac{K\alpha\phi}{f}.$$

Where K represents the width of the used dynamic neural network; $\alpha$ represents a CPU calculation efficiency factor, $\phi$ represents a computational complexity of the expert sublayer, $\phi=\|\theta_1\|\|\theta_2\|$, $\theta_1$ and $\theta_2$ represent parameters of the two linear layers of the expert sublayer respectively, and f represents the CPU frequency of the server.

As illustrated by the above example, in the step b43, K=1, 2, . . . ,M , f represents the CPU frequency of the server of the sample data group. The above calculation formula of $T_{com}$ is used, each user device of the sample data group can get one $T_{com}$ for each width K.

At the step b44, summing the operation delay and the transmission delay corresponding to each user device to obtain a sum delay corresponding to each user device, and calculating a product of the sum delay corresponding to each user device and the task importance weight in the task feature information of each user device to obtain a weighted sum delay corresponding to each user device.

Specifically, for the ith user device of the sample data group, a calculation process of the weighted sum delay can be expressed by the following formula:

$$T_i = w_i (T_{com} + T_{tra,i}).$$

Where $T_i$ represents the weighted sum delay of the ith user device of the sample data group; $(T_{com}+T_{tra,i})$ represents the sum delay of the ith user device of the sample data group, $w_i$ represents the task importance weight in the task feature information of the ith user device of the sample data group.

Due to the different importance of different tasks, the embodiment of the disclosure considers the importance of the tasks when calculating the total delay of each task, which can more accurately describe the task situation, so as to obtain the resource allocation results with better matching degree and adaptability.

It is understandable that for the sample data group, each user device can obtain the corresponding weighted sum delay $T_i$ for each width K.

At the step b45, calculating a sum of the weighted sum delays of the user devices of the sample data group to obtain a total delay of the resource allocation model with the fixed width in resource allocation for the sample data group.

For each width K, the weighted sum delay $T_i$ of each user device of the sample data group under this width K can be summed to obtain the total delay under this width K. Therefore, total delays are obtained for K=1, 2, . . . , M respectively.

At the step b5, determining the resource allocation model with the fixed width corresponding to a minimum of the total delays obtained by the sample data group as the optimal resource allocation model corresponding to the sample data group.

In the embodiment of the disclosure, since there are the user devices for task transmission, the overall optimization objective is defined as:

$$\min_K T = \sum_{i=1}^{N} T_i.$$

Where T represent the total delay of the tasks, $$\min_K T$$

represents calculating the width K with the minimum total delay as the optimization objective, N represents a total number of the user devices in the sample data group, and $T_i$ represents the weighted sum delay of the ith user device in the sample data group.

For the dynamic neural network, because the resource allocation models with different super parameters K have different operation delays and allocation effects, the knowledge driven method is used to obtain the optimal model. Specifically, for this sample data group, the resource allocation models with fixed widths under different conditions are traversed, the model performances are compared, and the minimum value of the total delays of the resource allocation models with fixed widths of K=1, 2, . . . ,M is obtained, the K corresponding to the minimum value is determined as the optimal width of the dynamic neural network corresponding to the sample data group, and the resource allocation model with the optimal width is determined as the optimal resource allocation model corresponding to the sample data group.

Therefore, through the above processing, the optimal resource allocation model is obtained for each sample data group, and the knowledge base is constructed from the sample data groups and the optimal resource allocation model corresponding to each sample data group. A variety of deployment environments that are consistent with the actual situations can be considered. Under each deployment environment, the optimal resource allocation model corresponding to each of the sample data groups can be built to form the knowledge base that represents the deployment environment and the optimal reasoning model.

Figure 5:
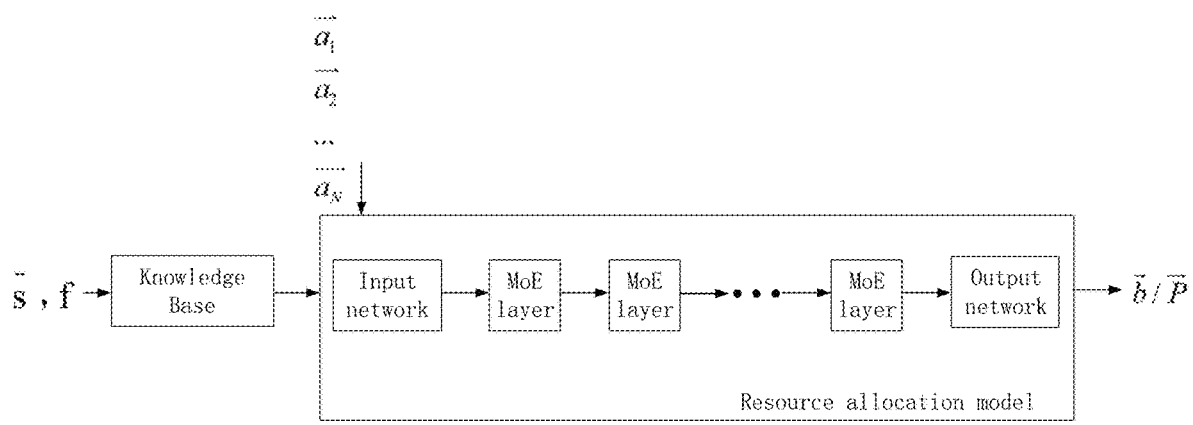
FIG. 5 illustrates a schematic diagram of an overall frame of a wireless communication network resource allocation method with dynamic adjustment on demand according to an embodiment of the present invention.

An overall framework of the wireless communication network recourse allocation method based on dynamical adjustment on demand provided by the embodiment of the disclosure can be understood in combination with FIG. 5. In the FIG. 5, $\vec{a}_1, \vec{a}_2, \ldots, \vec{a}_N$ represent the input vectors corresponding to the task feature information of the user devices acquired in the current time slot. $\bar{s}$ represents the task data volume average value calculated by the task data volumes of the user devices, f represents the CPU frequency of the server obtained in the current time slot. $\vec{b}/\vec{P}$ represents that the output of the power allocation model is the bandwidth allocation vector $\vec{b}$ or the power allocation vector $\vec{P}$. Knowledge base represents the knowledge base.

Figure 6:
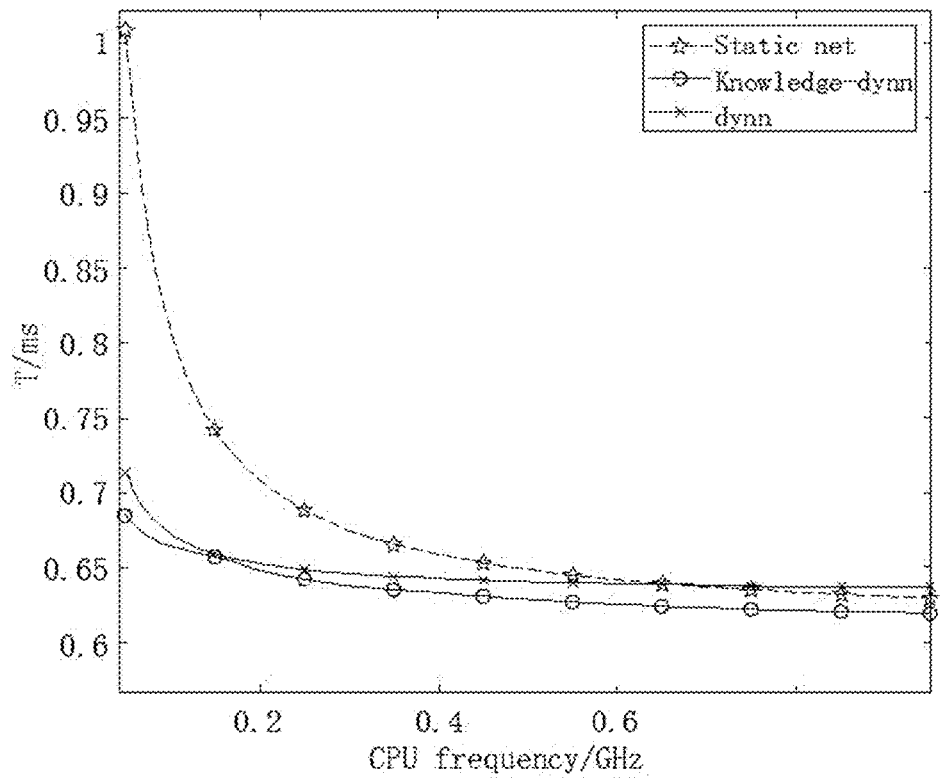
FIG. 6 illustrates a schematic diagram of a comparison of bandwidth allocation effects.
Figure 7:
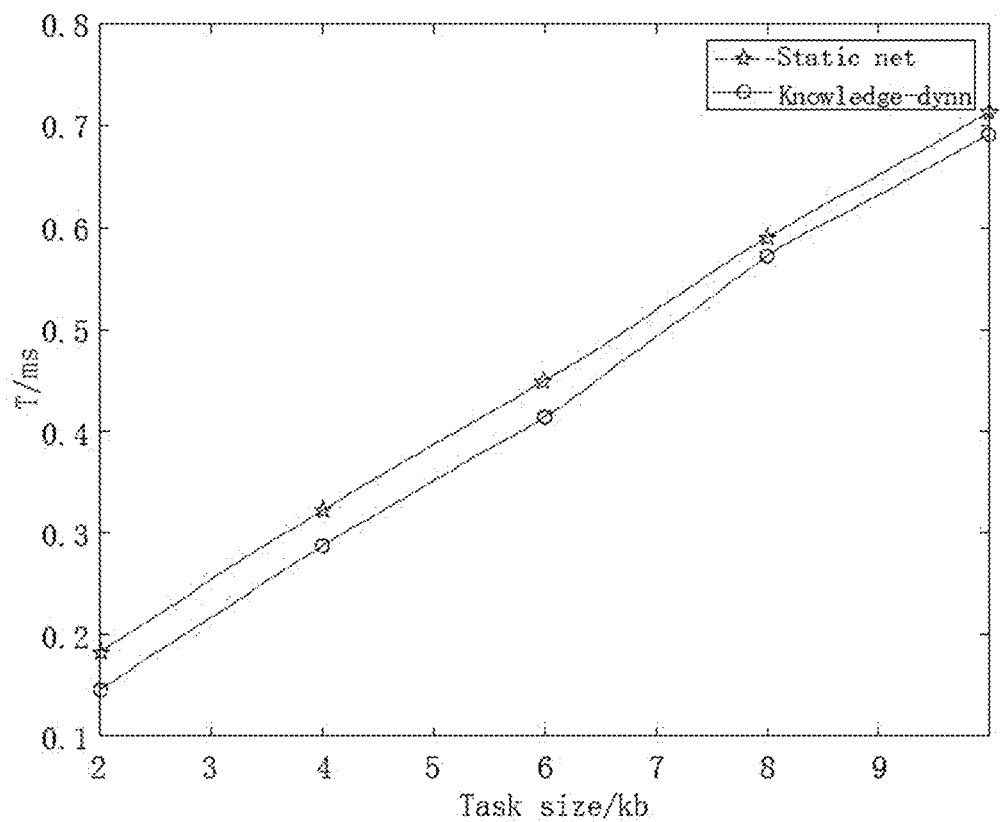
FIG. 7 illustrates a schematic diagram of a comparison of power allocation effects.
Figure 8:
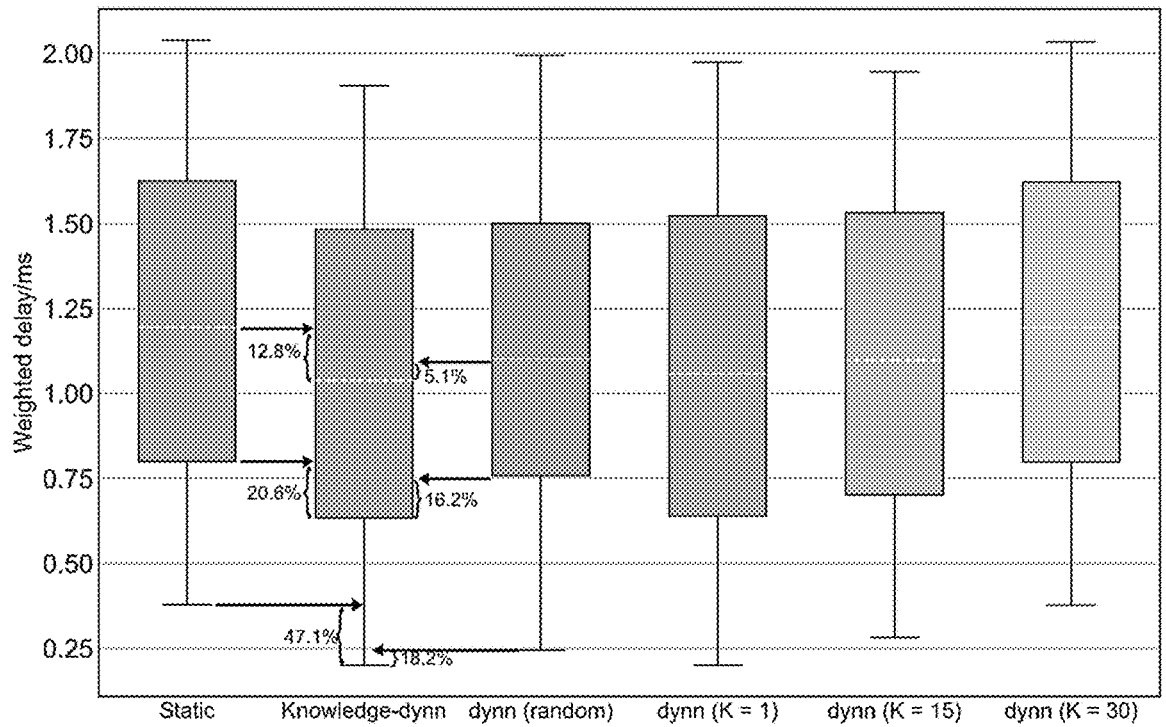
FIG. 8 illustrates a schematic diagram of a delay comparison of bandwidth allocation using different models under random CPU frequencies and task sizes.

For the effectiveness of the method of the embodiment of the disclosure, please understand it in combination with FIG. 6, FIG. 7 and FIG. 8. FIG. 6 illustrates a schematic diagram of a comparison of bandwidth allocation effects. FIG. 7 illustrates a schematic diagram of a comparison of power distribution effects. Among them, Static net is a traditional static neural network without gating network; dynn is a dynamic neural network with fixed value of K, knowledge-dynn is the method of the embodiment of the disclosure. T on the vertical axis represents the total delay. CPU frequency represents a CPU frequency, and Task size represents the average data volume. The simulation results in FIG. 6 and FIG. 7 show that the method of the embodiment of the disclosure is obviously superior to the traditional static neural network and dynn, the method of the embodiment of the disclosure significantly reduces the delay (including operation delay and transmission delay), and has higher flexibility in providing services on demand.

FIG. 8 illustrates a schematic diagram of a delay comparison of bandwidth allocation using different models under random CPU frequencies and task sizes, which shows delay comparison results of the bandwidth allocation by various methods under the condition of randomly selecting CPU frequencies and task sizes. In the FIG. 8, weighted delay of the vertical axis represents the delay, and the static of the horizontal axis represents the traditional static neural network without the gating function network; Knowledge-dynn represents the method of the embodiment of the disclosure; dynn (random) represents a dynamic neural network with a random fixed value of K; dynn (K=1), dynn (K=15), and dynn (K=30) represent dynamic neural networks with fixed values of K. As can be seen from FIG. 8, the knowledge assisted dynamic network performance of the embodiment of the disclosure is significantly better than the static network Static net and the dynamic network with the fixed value of K. Compared with the static network, the minimum delay of the embodiment of the disclosure is reduced by 47.1%, which reflects the significant advantages in the case of small tasks. Even when considering large tasks, significant performance improvements can still be observed, with the median and lower quartile of delay reduced by 12.8% and 20.6% respectively.

It should be noted that during the training of the resource allocation model, N represents the total number of the user devices in the training sample. During the construction of the knowledge base, N represents the total number of the user devices in the sample data group. These two values need not be the same as the total number of the user devices in the step S1, and when the same physical parameters are involved, the specific meaning should be distinguished and understood in combination with different stages of the embodiment of the disclosure.

In 6G wireless communication network, on-demand service is a key but challenging problem, because an emerging service demand has significant diversity, and network resources become more and more dynamic. The embodiments of the disclosure study the on-demand wireless network resource allocation problem, focus on the calculation delay in the resource allocation process, take the operation delay into account in the optimization problem, and propose the on-demand dynamic adjustment wireless communication network resource allocation method based on dynamic neural network, in which the model calculation complexity can be adjusted according to the service demand. The knowledge base is further constructed to represent the relationship of service requirements, available computing resources and resource allocation performance. By using these knowledges, the appropriate dynamic neural network width can be selected to achieve the effect of further optimization of resource allocation.

In the solutions provided by the embodiments of the disclosure, considering that the tasks generated by the user devices have different importance, the task importance weight is taken as a consideration factor to describe the task situation. For each time slot, the optimal solution of the width of the dynamic neural network is given under the comprehensive consideration of the operation delay and the transmission delay, and the optimal resource allocation model currently used for decision-making is determined, then the task feature information of the user devices in the current time slot is input into the optimal resource allocation model, and the optimal resource allocation solution can be obtained. The embodiments of the disclosure construct the resource allocation model with high reliability and low delay based on the dynamic neural network with adjustable width. Since the dynamic neural network used for decision-making can adjust the width according to the features of the task and the computing capacity of the server, can adaptively change the optimal resource allocation model according to the demand, so as to obtain the optimal resource allocation solution for each time slot and realize low delay multi task transmission, the speed of decision-making and the optimality of resource allocation can be adjusted on demand according to the service requirements and available computing resources, which has obvious flexibility.

The above descriptions are only the illustrated embodiments of the disclosure and are not used to limit the protection scope of the disclosure. Any amendment, equivalent replacement, improvement, etc. made within the spirit and principles of the disclosure are included in the protection scope of the disclosure.

What is claimed is:

1. A wireless communication network resource allocation method implemented in a server in a wireless communication network comprising user devices, the method comprising:
sending task feature information of each of the user devices for each of a plurality of time slots to the server, wherein:
the task feature information of each of the user devices comprises: a task data volume, a task transmission distance, and a task importance weight;
a task data volume average value is based on the task data volumes of the user devices;
a target optimal resource allocation model matched with the task data volume average value and a CPU frequency of the server is based on a knowledge base;
the knowledge base comprises: a plurality of sample data groups composed of different task data volume average values, CPU frequencies of the server, and optimal resource allocation models corresponding to the plurality of sample data groups respectively;
the optimal resource allocation model corresponding to each of the plurality of sample data groups is based on a minimum of total delays in resource allocation as an optimization objective, optimal widths of dynamic neural networks in trained resource allocation models, the task feature information of the user devices of the sample data group, and the CPU frequency of the server of the sample data group;
a resource to be allocated in each time slot is one of a bandwidth and a power; and
transmitting task data to the user devices based on resource allocation results, wherein resource allocation results are based on the task feature information of the user devices in each time slot and the target optimal resource allocation model.

2. The wireless communication network resource allocation method according to claim 1, wherein:
the resource allocation results are further based on resource allocation values of the user devices in each time slot;
the resource allocation values are based on input vectors of the user devices and the target optimal resource allocation model; and
the input vectors are based on the task feature information of each of the user devices in each time slot.

3. The wireless communication network resource allocation method according to claim 2, wherein:
the optimal resource allocation model corresponding to each of the plurality of sample data groups in the knowledge base is further based on a plurality of sample data groups composed of the different task data volume average values and the CPU frequencies of the server;
each of the plurality of sample data groups comprises one of the task data volume average values and one of the CPU frequencies of the server;
for each of the plurality of sample data groups, the task feature information of the user devices is based on the task data volume average value of the sample data group, and allocated resource data of each of the user devices;
the allocated resource data is the other one of the bandwidth and the power;

the trained resource allocation models have fixed widths corresponding to the dynamic neural networks having different widths;
the total delay of each of the trained resource allocation models with the fixed widths in the resource allocation is based on the task feature information of the user devices of the sample data group, the CPU frequency of the server of the sample data group, and the allocated resource data of the user devices of the sample data group; and
one of the trained resource allocation models with the fixed width corresponds to the minimum of the total delays of the sample data group as the optimal resource allocation model corresponding to the sample data group.

4. The wireless communication network resource allocation method according to claim 3, wherein:
the trained resource allocation models with fixed widths are based on initial resource allocation models; and
the initial resource allocation models are based on a dynamic neural network with an adjustable width; and
for each of the initial resource allocation models, training the initial resource allocation model through back propagation based on the task feature information of the user devices and a preset loss function.

5. The wireless communication network resource allocation method according to claim 4, wherein a structure of each of the initial resource allocation models comprises:
an input network, a plurality of expert layers, and an output network connected in sequential order;
wherein each of the plurality of expert layers comprises: an input sublayer, a gating function layer connected to an output end of the input sublayer, a softmax layer connected to an output end of the gating function layer, M number of expert sublayers in parallel with each other connected to another output end of the input sublayer and an output end of the softmax layer, and an output sublayer connected to output ends of the M number of expert sublayers; and
wherein the width of the dynamic neural network in the initial resource allocation model is based on a number of used expert sublayers of the M number of expert sublayers, and whether one of the M number of expert sublayers is used is controlled by a gating value.

6. The wireless communication network resource allocation method according to claim 5, wherein an input-output mapping function of a gating function network is that: G(X)=RemainK(H (X), K);
where H(X)=X·Wg+Normal·Softplus(X·W$_{noise}$), RemainK() represents a sparce function, K represents the width of the dynamic neural network, X represents an input matrix, Wg represents a weight coefficient matrix of the gating function network, Normal represents a standard normal white noise, Softplus() presents an activation function, and W$_{noise}$ represents a noise matrix.

7. The wireless communication network resource allocation method according to claim 5, wherein the preset loss function is that:

$$\text{Loss} = \sum_{i=1}^{N} w_i T_{tra,i} + L_{balance}, L_{balance} = W_{balance} \cdot CV\left(\sum_{j=1}^{M} g_j\right)^2;$$

where Loss represents the preset loss function, N represents a total number of the user devices in a training sample, $w_i$ represents the task importance weight in the task feature information of the ith user device in the training sample, $T_{ra,i}$ represents a transmission delay corresponding to the ith user device in the training sample, $L_{balance}$ represents an additional loss item, $W_{balance}$ represents a preset loss coefficient, CV() represents a variation coefficient function, M represents a total number of the expert sublayers, and $g_j$ represents the gating value of the jth expert sublayer.

8. The wireless communication network resource allocation method according to claim 7, wherein:

for each of the resource allocation models with the fixed widths, resource allocation results of the user devices of the sample data group through the resource allocation model with the fixed width are based on the task feature information of the user devices of the sample data group;

transmission delays generated by the server transmitting task data to the user devices respectively are based on the resource allocation results of the user devices of the sample data group and the allocated resource data of the user devices of the sample data group;

an operation delay generated by the server using the resource allocation model with the fixed width is based on the CPU frequency of the server of the sample data group;

a sum delay of each of the user devices is based on the transmission delay and the operation delay of each of the user devices;

a weighted sum delay of each of the user devices is based on the sum delay of each of the user devices and the task importance weight of the task feature information of each of the user devices; and a total delay of the resource allocation model with the fixed width in the resource allocation for the sample data group is based on a sum of the weighted sum delays of the user devices of the sample data group.

9. The wireless communication network resource allocation method according to claim 8, wherein a calculation formula of the transmission delay is that:

$$T_{tra,i} = \frac{s_i}{b_i \log_2\left(1 + \frac{P_i\left(\frac{d_0}{d_i}\right)^2 g_0}{\sigma^2}\right)};$$

where $s_i$ represents the task data volume of the task feature information of the ith user device, $d_i$ represents the task transmission distance of the task feature information of the ith user device, $d_0$ represents an unit distance, $g_0$ represents a channel gain, $\sigma^2$ represents a noise power, $P_i$ represents a power allocated to the ith user device, $b_i$ represents a bandwidth allocated to the ith user device, one of $P_i$ and $b_i$ is based on the resource allocation model with the fixed width, and the other one of $P_i$ and $b_i$ represents the allocated resource data.

10. The wireless communication network resource allocation method according to claim 8, wherein a calculation formula of the operation delay is that:

$$T_{com} = \frac{K\alpha\phi}{f};$$

where K represents the width of the dynamic neural network, $\alpha$ represents a CPU calculation efficiency factor, $\Phi$ represents a computational complexity of the expert sublayer, and f represents the CPU frequency of the serve.

* * * * *